US012427838B2

(12) United States Patent
Yahia et al.

(10) Patent No.: US 12,427,838 B2
(45) Date of Patent: Sep. 30, 2025

(54) THERMAL CONDITIONING SYSTEM

(71) Applicant: VALEO SYSTEMES THERMIQUES, La Verriere (FR)

(72) Inventors: Mohamed Yahia, La Verriere (FR); Bertrand Nicolas, La Verriere (FR); Stefan Karl, La Verriere (FR)

(73) Assignee: Valeo Systemes Thermiques, La Verriere (FR)

( * ) Notice: Subject to any disclaimer, the term of this patent is extended or adjusted under 35 U.S.C. 154(b) by 102 days.

(21) Appl. No.: 18/550,709

(22) PCT Filed: Mar. 15, 2022

(86) PCT No.: PCT/EP2022/056596
§ 371 (c)(1),
(2) Date: Sep. 15, 2023

(87) PCT Pub. No.: WO2022/194808
PCT Pub. Date: Sep. 22, 2022

(65) Prior Publication Data
US 2024/0181847 A1    Jun. 6, 2024

(30) Foreign Application Priority Data
Mar. 15, 2021    (FR) ...................... 2102564

(51) Int. Cl.
*B60H 1/32*    (2006.01)
*B60H 1/00*    (2006.01)
(Continued)

(52) U.S. Cl.
CPC ......... *B60H 1/323* (2013.01); *B60H 1/00278* (2013.01); *B60H 1/00921* (2013.01);
(Continued)

(58) Field of Classification Search
CPC ................ B60H 1/323; B60H 1/00278; B60H 1/00921; B60H 1/32284;
(Continued)

(56) References Cited

U.S. PATENT DOCUMENTS 8,517,087 B2 *  8/2013  Zeigler .............. B60H 1/00907
                                                         62/324.1
8,549,868 B2 * 10/2013  Komori ..................... F24D 3/08
                                                         62/238.7
(Continued)

FOREIGN PATENT DOCUMENTS

CN    209274301 U    8/2019
DE    102018218264 A1    4/2020
(Continued)

OTHER PUBLICATIONS

European Patent Office, International Search Report (with English translation) and Written Opinion of corresponding International Application No. PCT/EP2022/056596, dated Jun. 20, 2022.

*Primary Examiner* — Len Tran
*Assistant Examiner* — Ljiljana V. Ciric
(74) *Attorney, Agent, or Firm* — Valeo Systemes Thermiques

(57) ABSTRACT

A thermal conditioning system including a heat-transfer circuit, a refrigerant circuit including successively: a compressor, a first bi-fluid exchanger and a second bi-fluid exchanger arranged jointly on the refrigerant circuit and on a main loop of the heat-transfer circuit, a first expansion valve, a third bi-fluid exchanger arranged jointly on the refrigerant circuit and on a secondary loop of the heat-transfer circuit, a first branch of the heat-transfer circuit being configured so that the heat-transfer liquid leaving the first bi-fluid exchanger returns to the first bi-fluid exchanger without passing through the second bi-fluid exchanger, and including a second heat exchanger configured to exchange (Continued)

with a second air flow. A second branch connects the first branch to the main loop, and includes a third heat exchanger configured to exchange with the second air flow.

15 Claims, 5 Drawing Sheets

(51) Int. Cl.
| | |
|---|---|
| *F25B 5/02* | (2006.01) |
| *F25B 6/04* | (2006.01) |
| *F25B 25/00* | (2006.01) |
| *H01M 10/625* | (2014.01) |
| *H01M 10/663* | (2014.01) |

(52) U.S. Cl.
CPC .......... *B60H 1/32284* (2019.05); *F25B 5/02* (2013.01); *F25B 6/04* (2013.01); *F25B 25/005* (2013.01); *H01M 10/625* (2015.04); *H01M 10/663* (2015.04); *B60H 2001/00307* (2013.01); *B60H 2001/00928* (2013.01); *B60H 2001/00949* (2013.01); *H01M 2220/20* (2013.01)

(58) Field of Classification Search
CPC ........... B60H 2001/00307; B60H 2001/00928; B60H 2001/00949; F25B 5/02; F25B 6/04; F25B 25/005; H01M 10/625; H01M 10/663; H01M 2220/20
See application file for complete search history.

(56) References Cited

U.S. PATENT DOCUMENTS

| | | | | |
|---|---|---|---|---|
| 9,915,453 | B2* | 3/2018 | Moses | F25B 41/00 |
| 11,413,930 | B2* | 8/2022 | Benouali | B60H 1/00921 |
| 11,479,079 | B2* | 10/2022 | Yahia | B60H 1/00278 |
| 11,850,908 | B2* | 12/2023 | Benouali | F25B 5/04 |
| 11,867,443 | B2* | 1/2024 | Benouali | F25B 6/04 |
| 12,194,813 | B2* | 1/2025 | Yahia | B60H 1/32281 |
| 2012/0000236 | A1* | 1/2012 | Ogata | F24D 3/18 62/324.2 |
| 2017/0184314 | A1* | 6/2017 | Ogata | F24D 19/1039 |
| 2024/0100909 | A1* | 3/2024 | Yahia | B60H 1/00885 |
| 2024/0181847 | A1* | 6/2024 | Yahia | B60H 1/323 |
| 2024/0416725 | A1* | 12/2024 | Akiki | B60H 1/3205 |

FOREIGN PATENT DOCUMENTS

| | | |
|---|---|---|
| EP | 2933586 A1 | 10/2015 |
| WO | 2013055088 A1 | 4/2013 |
| WO | WO-2022096200 A1 * | 5/2022 |

* cited by examiner

THERMAL CONDITIONING SYSTEM

TECHNICAL FIELD

The present invention concerns the field of thermal conditioning systems. These systems can notably equip a motor vehicle. Such systems make it possible, for example, to thermally regulate various parts of the vehicle, such as the car interior or an electrical energy storage battery, in the case of an electrically powered vehicle. Exchanges of heat are mainly managed by the compression and expansion of a refrigerant fluid within multiple heat exchangers.

BACKGROUND OF THE INVENTION

Current thermal conditioning systems use a loop for refrigerant fluid and a loop for heat-transfer fluid which exchanges heat with the refrigerant fluid. Such systems are thus referred to as indirect. Patent EP2933586 B1 is one example of this. The loop for refrigerant fluid is formed such that the refrigerant fluid gives up heat to a heat-transfer liquid in a bifluid exchanger and then passes through a heat exchanger disposed in the car interior, also referred to as evaporator. This heat exchanger makes it possible to cool the car interior. The car interior is heated notably by a heating radiator which dissipates the heat from the heat-transfer liquid into the air stream sent to the car interior.

The various heat exchangers are conventionally distributed among various locations in the vehicle. Some exchangers are disposed in the interior of the vehicle. Other exchangers are disposed under the hood, close to the front end of the vehicle. The various components of the thermal conditioning system are connected by lines for the circulation of the refrigerant fluid and the heat-transfer fluid. The integration of all the components can be difficult. In addition, when the vehicle is being assembled, each component must be mounted one at a time. The refrigerant fluid circuit must be filled once the mounting is finished, and the leaktightness of the circuit and the correct operation of the assembly must then be checked. The mounting and checking time is therefore relatively lengthy.

As a result, there is a need for thermal conditioning systems which can be integrated more easily and can be supplied in the form of an already-tested module which is ready for operation. In addition, it is advantageous to have thermal conditioning systems which enable greater standardization of the components used.

BRIEF SUMMARY OF THE INVENTION

To this end, the present invention proposes a thermal conditioning system having:
a heat-transfer liquid circuit having:
a main circulation loop, a secondary loop, a first branch and a second branch,
a refrigerant fluid circuit comprising a main loop for circulation of refrigerant fluid having the following in succession in a direction of circulation of the refrigerant fluid:
a compression device,
a first bifluid exchanger arranged both on the refrigerant fluid circuit and on the main loop of the heat-transfer liquid circuit so as to enable an exchange of heat between the refrigerant fluid and the heat-transfer liquid in the main loop,
a second bifluid exchanger arranged both on the refrigerant fluid circuit and on the main loop of the heat-transfer liquid circuit so as to enable an exchange of heat between the refrigerant fluid and the heat-transfer liquid in the main loop,
a first expansion device,
a third bifluid exchanger arranged both on the refrigerant fluid circuit and on the secondary loop of the heat-transfer liquid circuit so as to enable an exchange of heat between the refrigerant fluid and the heat-transfer liquid in the secondary loop,
wherein the first branch of the heat-transfer liquid circuit links a first connection point disposed on the main loop to a second connection point disposed on the main loop, the first branch being configured such that the heat-transfer liquid at the outlet of the first bifluid exchanger returns to an inlet of the first bifluid exchanger without passing through the second bifluid exchanger, the first branch having a second heat exchanger configured to exchange heat with a second air stream,
and wherein the second bypass branch of the heat-transfer liquid circuit links a third connection point disposed on the first branch downstream of the second heat exchanger to a fourth connection point disposed on the main loop upstream of the second bifluid exchanger,
the second bypass branch having a third heat exchanger configured to exchange heat with the second air stream.

The structure proposed for the thermal conditioning system, with two bifluid exchangers in series in the direction of the circulation of refrigerant fluid, each bifluid exchanger being coupled to a heat exchanger that can absorb or dissipate heat in the second air stream, enables multiple modes of operation that make it possible to optimize the thermodynamic performance depending on the operating conditions. The proposed structure is particularly simple for the refrigerant fluid circulation lines, this making it possible to obtain a compact refrigerant fluid circuit that uses a small amount of refrigerant fluid.

The features listed in the following paragraphs can be implemented independently of one another or in any technically possible combination.

The main loop of the heat-transfer liquid circuit has a first heat exchanger configured to exchange heat with a first air stream.

The thermal conditioning system is a thermal conditioning system for a motor vehicle.

The first air stream is an air stream internal to an interior of a motor vehicle.

The second air stream is an air stream external to an interior of the vehicle.

The third heat exchanger is disposed upstream of the second heat exchanger in a direction of flow of the second air stream.

The third bifluid exchanger is configured to be thermally coupled to a first element of an electric powertrain of a motor vehicle.

The first element of the electric powertrain of the vehicle is configured to exchange heat with the heat-transfer liquid circulating in the secondary loop for heat-transfer liquid.

The first element of the electric powertrain of the vehicle comprises an electric traction motor of the vehicle.

The first element of the electric powertrain of the vehicle is an electronic module for controlling an electric traction motor of the vehicle.

The main loop of the heat-transfer liquid circuit and the secondary loop of the heat-transfer liquid circuit are configured to be in communication.

The secondary loop of the heat-transfer liquid circuit is fluidically linked to the first branch of the heat-transfer liquid circuit.

The heat-transfer liquid circuit has a third branch linking a fifth connection point disposed on the first branch between the first connection point and the second heat exchanger to a sixth connection point disposed on the secondary loop downstream of the first element.

The heat-transfer liquid circuit has a fourth branch linking a seventh connection point disposed on the secondary loop upstream of the first element to an eighth connection point disposed on the first branch between the third connection point and the second connection point.

The refrigerant fluid circuit has a first bypass branch linking a first junction point disposed on the main loop downstream of the second bifluid exchanger and upstream of the third bifluid exchanger to a second junction point disposed on the main loop downstream of the third bifluid exchanger and upstream of the compression device, the first bypass branch having a fourth bifluid exchanger configured to be thermally coupled to a second element of an electric powertrain of the vehicle.

The fourth bifluid exchanger is configured to exchange heat with a heat-transfer liquid circulating in an auxiliary loop.

The second element of the electric powertrain is disposed on the auxiliary loop for heat-transfer liquid. The second element of the electric powertrain of the vehicle is configured to exchange heat with the heat-transfer liquid in the auxiliary loop.

The second element of the electric powertrain of the vehicle is an electrical energy storage battery.

The first bypass branch has a second expansion device disposed upstream of the fourth bifluid exchanger.

The first junction point is disposed on the main loop of the refrigerant fluid circuit upstream of the first expansion device.

The main loop of the refrigerant fluid circuit has a refrigerant fluid accumulation device disposed downstream of the third bifluid exchanger and upstream of the compression device.

The main loop of the refrigerant fluid circuit has a refrigerant fluid accumulation device disposed downstream of the third bifluid exchanger and upstream of the second junction point.

The main loop of the refrigerant fluid circuit has a refrigerant fluid accumulation device disposed downstream of the second junction point and upstream of the compression device.

The refrigerant fluid circuit has a second bypass branch linking a third junction point disposed on the main loop downstream of the second bifluid exchanger and upstream of the first junction point to a fourth junction point disposed on the main loop downstream of the third bifluid exchanger and upstream of the second junction point, the second bypass branch having the following in succession: a third expansion device and a fourth heat exchanger configured to exchange heat with the first air stream.

The fourth heat exchanger is disposed upstream of the third heat exchanger in a direction of flow of the second air stream.

The refrigerant fluid circuit has a third bypass branch linking a fifth junction point disposed on the main loop downstream of the compression device and upstream of the second bifluid exchanger to a sixth junction point disposed on the main loop downstream of the fifth junction point, the third bypass branch having a fifth heat exchanger configured to exchange heat with the second air stream.

The fifth heat exchanger is disposed downstream of the second heat exchanger in a direction of flow of the second air stream.

The refrigerant fluid circuit has a fourth bypass branch linking a seventh junction point disposed on the main loop downstream of the fourth junction point and upstream of the compression device to an eighth junction point disposed on the third bypass branch downstream of the fifth junction point and upstream of the fifth heat exchanger.

The refrigerant fluid circuit has a fifth bypass branch linking a ninth junction point disposed on the main loop downstream of the third junction point and upstream of the third bifluid exchanger to a tenth junction point disposed on the third bypass branch downstream of the fifth heat exchanger and upstream of the sixth junction point, and the fifth bypass branch has a fourth expansion device.

According to one embodiment, the main loop of the refrigerant fluid circuit comprises a sixth heat exchanger disposed upstream of the first expansion device, the sixth heat exchanger being configured to exchange heat with the first air stream.

The sixth heat exchanger is disposed upstream of the first bifluid exchanger in the direction of travel of the refrigerant fluid.

According to another embodiment of the thermal conditioning system, the refrigerant fluid circuit has a sixth bypass branch linking an eleventh junction point disposed on the main loop upstream of the first bifluid exchanger to a twelfth junction point disposed on the main loop downstream of the second bifluid exchanger, and wherein the sixth bypass branch comprises a sixth heat exchanger configured to exchange heat with the first air stream.

The main loop of the refrigerant fluid circuit has a first shut-off valve disposed between the fifth junction point and the sixth junction point.

The third bypass branch has a second shut-off valve disposed between the fifth junction point and the eighth junction point.

The fourth bypass branch has a third shut-off valve.

The third bypass branch has a first non-return valve configured to prevent circulation of the refrigerant fluid from the sixth junction point to the tenth junction point.

The fifth bypass branch has a second non-return valve configured to prevent circulation of the refrigerant fluid from the tenth junction point to the ninth junction point.

The main loop for heat-transfer liquid has a first heat-transfer liquid circulation pump.

The first heat-transfer liquid circulation pump is disposed between the first connection point and the second connection point.

The first circulation pump is configured to circulate the heat-transfer liquid from the first bifluid exchanger to the first connection point.

The secondary loop for heat-transfer liquid has a second heat-transfer liquid circulation pump.

The second heat-transfer liquid circulation pump is disposed on the secondary loop between the seventh connection point and the sixth connection point.

The second heat-transfer liquid circulation pump is configured to circulate the heat-transfer liquid from the seventh connection point to the sixth connection point.

The main loop for circulation of heat-transfer liquid has a first three-way valve disposed both on the main loop and on the first branch.

The secondary loop for circulation of heat-transfer liquid has a second three-way valve disposed both on the secondary loop and on the third branch.

The thermal conditioning system has a casing which defines a receiving volume, and the main loop of the refrigerant fluid circuit is inside the casing.

The casing defines a volume which is leaktight with respect to the refrigerant fluid.

The casing defines a closed volume which incorporates the refrigerant fluid circuit.

The first bypass branch of the refrigerant fluid circuit is inside the casing.

The second bypass branch of the refrigerant fluid circuit has a first portion inside the casing, the casing has a first inlet/outlet for refrigerant fluid, the first portion linking the third junction point and the ninth inlet/outlet.

The second bypass branch of the refrigerant fluid circuit has a second portion inside the casing, the casing has a second inlet/outlet for refrigerant fluid, the second portion linking the fourth junction point and the second inlet/outlet.

The third expansion device is inside the casing.

The third bypass branch of the refrigerant fluid circuit has a third portion inside the casing, the casing has a third inlet/outlet for refrigerant fluid, the third portion linking the fifth junction point and the third inlet/outlet.

The third bypass branch of the refrigerant fluid circuit has a fourth portion inside the casing, the casing has a fourth inlet/outlet for refrigerant fluid, the fourth portion linking the sixth junction point and the fourth inlet/outlet.

The fourth bypass branch is inside the casing.

The fifth bypass branch is inside the casing.

The main loop of the heat-transfer liquid circuit has a fifth portion inside the casing, the casing has a fifth inlet/outlet for heat-transfer liquid and a sixth inlet/outlet for heat-transfer liquid, the fifth portion linking the fifth inlet/outlet and the sixth inlet/outlet, and the first bifluid exchanger and the second bifluid exchanger are disposed on the fifth portion.

The first heat-transfer liquid circulation pump is inside the casing.

The first branch of the heat-transfer liquid circuit has a sixth portion inside the casing, the casing has a seventh inlet/outlet for heat-transfer liquid, the sixth portion linking the seventh inlet/outlet and the second connection point.

The second connection point is disposed inside the casing.

The second branch of the heat-transfer liquid circuit has a seventh portion inside the casing, the receiving casing has an eighth inlet/outlet for heat-transfer liquid, and the seventh portion links the eighth inlet/outlet and the fourth connection point.

The secondary loop of the heat-transfer liquid circuit has an eighth portion inside the casing, the casing has a ninth inlet/outlet for heat-transfer liquid and a tenth inlet/outlet for heat-transfer liquid, the eighth portion linking the ninth inlet/outlet and the tenth inlet/outlet, and the third bifluid exchanger is disposed on the eighth portion.

The main loop of the heat-transfer liquid circuit has a ninth portion inside the casing, the casing has an eleventh inlet/outlet for heat-transfer liquid and a twelfth inlet/outlet for heat-transfer liquid, the ninth portion linking the eleventh inlet/outlet and the twelfth inlet/outlet.

The main loop of the heat-transfer liquid circuit has an electric heating device configured to heat the heat-transfer liquid.

The electric heating device is disposed outside the casing.

The electric heating device is inside the casing.

The auxiliary loop of the heat-transfer liquid circuit has a tenth portion inside the casing, the casing has a thirteenth inlet/outlet for heat-transfer liquid and a fourteenth inlet/outlet for heat-transfer liquid, the tenth portion linking the thirteenth inlet/outlet and the fourteenth inlet/outlet, and the fourth bifluid exchanger is disposed on the tenth portion.

The main loop comprises an internal heat exchanger, the internal heat exchanger having a first heat exchange section disposed downstream of the tenth bifluid exchanger and upstream of the first junction point and a second heat exchange section disposed downstream of the refrigerant fluid accumulation device and upstream of the compression device, the internal heat exchanger being configured to enable an exchange of heat between the refrigerant fluid in the first heat exchange section and the refrigerant fluid in the second heat exchange section.

The invention also relates to a method for operating a thermal conditioning system as described above in a mode referred to as cooling mode, in which:

the refrigerant fluid circulates in the compression device, where it is brought to high pressure, and circulates in succession in the fifth heat exchanger, where it gives up heat to the second air stream, in the first bifluid exchanger, in the second bifluid exchanger, in the third expansion device, where it is brought to low pressure, and in the fourth heat exchanger, where it absorbs heat from the first air stream, the low-pressure refrigerant fluid returning to the compression device, the heat-transfer liquid circulates in succession in the second bifluid exchanger, in the first bifluid exchanger, and in the second heat exchanger, where it gives up heat to the second air stream, and splits into a first flow circulating in the first branch and a second flow circulating in the second branch, the first flow meeting the main loop upstream of the first bifluid exchanger and the second flow meeting the main loop upstream of the second bifluid exchanger.

The invention also relates to a method for operating a thermal conditioning system as described above in a mode referred to as heating mode, in which:

the refrigerant fluid circulates in the compression device, where it is brought to high pressure, and circulates in succession in the first bifluid exchanger, where it gives up heat to the heat-transfer liquid, in the second bifluid exchanger, where it gives up heat to the heat-transfer liquid, in the fourth expansion device, where it is brought to low pressure, and in the fifth heat exchanger, where it absorbs heat from the second air stream, the low-pressure refrigerant fluid returning to the compression device, the heat-transfer liquid circulates in succession in the second bifluid exchanger, where it receives heat from the refrigerant fluid, in the first bifluid exchanger, where it receives heat from the refrigerant fluid, and in the first heat exchanger, where it gives up heat to the first air stream.

The invention also concerns a method for operating a thermal conditioning system as described above in a mode referred to as parallel dehumidification mode, in which:

the refrigerant fluid circulates in the compression device, where it is brought to high pressure, and circulates in succession in the first bifluid exchanger, where it gives up heat to the heat-transfer liquid, and in the second bifluid exchanger, where it gives up heat to the heat-transfer liquid, and splits into a first flow and a second flow, the first flow circulating in the fourth expansion device, where it is brought to low pressure, and in the fifth heat exchanger, where it absorbs heat from the second air stream, the second flow circulating in the third expansion device, where it is brought to low pressure, and in the fourth heat exchanger, where it absorbs heat from the first air stream, the first flow of low-pressure refrigerant fluid and the second flow of low-pressure refrigerant fluid meeting one another before reaching the compression device, the heat-transfer liquid circulates in succession in the second bifluid exchanger, where it receives heat from the refrigerant fluid, in the first bifluid exchanger, where it receives heat from the refrigerant fluid, and in the first heat exchanger, where it gives up heat to the first air stream.

BRIEF DESCRIPTION OF THE DRAWINGS

Further features, details and advantages will become apparent on reading the detailed description below, and on studying the appended drawings, in which.

DETAILED DESCRIPTION OF THE INVENTION

Figure 1:
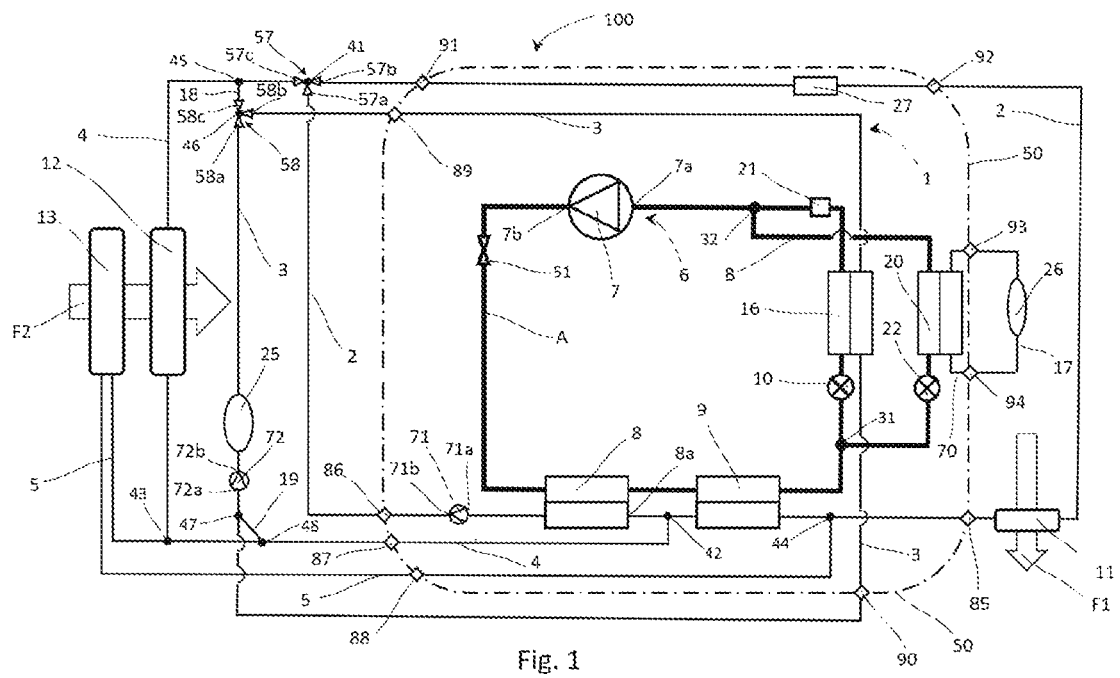
FIG. 1 is a schematic view of a thermal conditioning system according to a first embodiment of the invention.

In order to make it easier to read the figures, the various elements are not necessarily shown to scale. In these figures, identical elements have the same reference signs. Some elements or parameters can be indexed, in other words designated for example first element or second element, or first parameter and second parameter, etc. The purpose of this indexing is to make a distinction between elements or parameters that are similar but not identical. This indexing does not imply a priority of one element or parameter with respect to another. It is possible to interchange the terms 'first', 'second', 'third', etc.

In the following description, the expression "a first element upstream of a second element" means that the first element is placed before the second element in relation to the direction of circulation, or travel, of a fluid. Similarly, the term "a first element downstream of a second element" means that the first element is placed after the second element in relation to the direction of circulation, or travel, of the fluid in question. In the case of the refrigerant fluid circuit, the expression "a first element is upstream of a second element" means that the refrigerant fluid travels in succession through the first element and then the second element, without passing through the compression device. In other words, the refrigerant fluid leaves the compression device, possibly passes through one or more elements, and then passes through the first element, then the second element, and then returns to the compression device, possibly having passed through other elements.

When it is specified that a sub-system has a given element, this does not rule out the presence of other elements in this sub-system.

Each of the expansion devices used can be an electronic expansion device, a thermostatic expansion device, or a calibrated orifice. In the case of an electronic expansion device, the passage cross section through which the refrigerant fluid can pass can be regulated continuously between a closed position and a position of maximum opening. To this end, the control unit of the system manages an electric motor which moves a movable shut-off means controlling the passage cross section available to the refrigerant fluid.

The compression device 7 can be an electric compressor, that is a compressor of which the movable parts are driven by an electric motor. The compression device 7 has an intake side for the low-pressure refrigerant fluid, also referred to as inlet 7a of the compression device, and a delivery side for the high-pressure refrigerant fluid, also referred to as outlet 7b of the compression device 7. The internal movable parts of the compressor 7 transfer the refrigerant fluid from an inlet on the low-pressure side to an outlet on the high-pressure side. After expansion in one or more expansion members, the refrigerant fluid returns to the inlet 7a of the compressor 7 and begins a new thermodynamic cycle again.

Each junction point allows the refrigerant fluid to enter one or the other of the circuit portions that meet at this junction point. The refrigerant fluid is distributed between the circuit portions that meet at a junction point by varying the opening or closure of the shut-off valves or expansion devices that are present on each of the branches joined to this point. In other words, each junction point is a means for redirecting the refrigerant fluid that arrives at this junction point.

Shut-off valves and non-return valves thus make it possible to selectively direct the refrigerant fluid into the various branches of the refrigerant circuit in order to provide different modes of operation, as will be described below.

The refrigerant fluid used by the refrigerant fluid circuit 1 is in this case a chemical fluid such as R1234yf. Other refrigerant fluids could be used, such as R134a or R290.

FIG. 1 shows a first embodiment of a thermal conditioning system 100 having:
a heat-transfer liquid circuit 1 having:
a main circulation loop 2, a secondary loop 3, a first branch 4 and a second branch 5,
a refrigerant fluid circuit 6 comprising a main loop A for circulation of refrigerant fluid having the following in succession in a direction of circulation of the refrigerant fluid:
a compression device 7,
a first bifluid exchanger 8 arranged both on the refrigerant fluid circuit 6 and on the main loop 2 of the heat-transfer liquid circuit 1 so as to enable an exchange of heat between the refrigerant fluid and the heat-transfer liquid in the main loop 2, a second bifluid exchanger 9 arranged both on the refrigerant fluid circuit 6 and on the main loop 2 of the heat-transfer liquid circuit 1 so as to enable an exchange of heat between the refrigerant fluid and the heat-transfer liquid in the main loop 2, a first expansion device 10, a third bifluid exchanger 16 arranged both on the refrigerant fluid circuit 6 and on the secondary loop 3 of the heat-transfer liquid circuit 1 so as to enable an exchange of heat between the refrigerant fluid and the heat-transfer liquid in the secondary loop 3, the first branch 4 of the heat-transfer liquid circuit 1 links a first connection point 41 disposed on the main loop 2 to a second connection point 42 disposed on the main loop 2, the first branch 4 being configured such that the heat-transfer liquid at the outlet of the first bifluid exchanger 8 returns to an inlet 8a of the first bifluid exchanger 8 without passing through the second bifluid exchanger 9, the first branch 4 having a second heat exchanger 12 configured to exchange heat with a second air stream F2, and the second branch 5 of the heat-transfer liquid circuit 1 links a third connection point 43 disposed on the first branch 4 downstream of the second heat exchanger 12 to a fourth connection point 44 disposed on the main loop 2 upstream of the second bifluid exchanger 9, the second branch 5 having a third heat exchanger 13 configured to exchange heat with the second air stream F2. The main loop 2 of the heat-transfer liquid circuit 1 has a first heat exchanger 11 configured to exchange heat with a first air stream F1.

In the example illustrated, the thermal conditioning system 100 is a thermal conditioning system for a motor vehicle. The first air stream F1 is an air stream inside an interior of a motor vehicle. The second air stream F2 is an air stream external to an interior of the vehicle.

An internal air stream is understood to mean an air stream which is intended for the interior of the motor vehicle. This internal air stream can circulate in an HVAC (Heating, Ventilating and Air Conditioning) installation. This installation has not been shown in the various figures.

An external air stream is an air stream which is not intended for the interior of the vehicle. In other words, this air stream remains outside the vehicle. Engine fans, not shown, can be activated in order to increase the flow rate of the external air stream De if required; similarly, other engine fans, not shown either, are disposed in the heating installation in order to increase the flow rate of the internal air stream if required.

An electronic control unit, not shown either, receives information from various sensors that notably measure the characteristics of the refrigerant fluid at various points of the circuit. The electronic unit also receives the setpoints requested by the occupants of the vehicle, such as the temperature desired inside the car interior. The setpoints can also come from other electronic systems, for example from the system that controls the batteries in the event of an electric vehicle. The electronic control unit implements control laws for managing the various actuators in order to control the thermal management system 100.

The first branch 4 of the heat-transfer liquid circuit 1 is a bypass branch of the main loop 2. Similarly, the second branch 5 of the heat-transfer liquid circuit 1 is a bypass branch of the first branch 4.

The third heat exchanger 13 is disposed upstream of the second heat exchanger 12 in a direction of flow of the second air stream F2. As a result, the third heat exchanger 13 receives an air stream which has not exchanged heat with another heat exchanger.

The third bifluid exchanger 16 is configured to be thermally coupled to a first element 25 of an electric powertrain of a motor vehicle.

The first element 25 of the electric powertrain of the vehicle is configured to exchange heat with the heat-transfer liquid circulating in the secondary loop 3 for heat-transfer liquid. The first element 25 of the electric powertrain of the vehicle comprises an electric traction motor of the vehicle. The first element 25 of the electric powertrain of the vehicle can comprise an electronic module for controlling an electric traction motor of the vehicle.

The secondary loop 3 makes it possible to thermally regulate the battery 25 in order to keep it within a temperature range of optimum operation. It similarly makes it possible to thermally regulate the electronic module for controlling the electric motor.

The main loop 2 of the heat-transfer liquid circuit 1 and the secondary loop 3 of the heat-transfer liquid circuit 1 are configured to be in communication. In other words, the main loop 2 and the secondary loop 3 can be fluidically linked.

The secondary loop 3 of the heat-transfer liquid circuit 1 is fluidically linked to the first branch 4 of the heat-transfer liquid circuit 1. Thus, the heat-transfer liquid circuit 1 has a third branch 18 linking a fifth connection point 45 disposed on the first branch 4 between the first connection point 41 and the second heat exchanger 12 to a sixth connection point 46 disposed on the secondary loop 3 downstream of the first element 25.

The heat-transfer liquid circuit 1 has a fourth branch 19 linking a seventh connection point 47 disposed on the secondary loop 3 upstream of the first element 25 to an eighth connection point 48 disposed on the first branch 4 between the third connection point 43 and the second connection point 42. The third branch 18 is a bypass branch. The fourth branch 19 is a bypass branch. The third branch 18 and the fourth branch 19 ensure fluidic communication between the main loop 2 and the secondary loop 3.

As shown in FIG. 1, the refrigerant fluid circuit 6 has a first bypass branch B linking a first junction point 31 disposed on the main loop A downstream of the second bifluid exchanger 9 and upstream of the third bifluid exchanger 16 to a second junction point 32 disposed on the main loop A downstream of the third bifluid exchanger 16 and upstream of the compression device 7, the first bypass branch B having a fourth bifluid exchanger 20 configured to be thermally coupled to a second element 26 of an electric powertrain of the vehicle.

The fourth bifluid exchanger 20 is configured to exchange heat with a heat-transfer liquid circulating in an auxiliary loop 17. The second element 26 of the electric powertrain is disposed on the auxiliary loop 17 for heat-transfer liquid. The second element 26 of the electric powertrain of the vehicle is configured to exchange heat with the heat-transfer liquid in the auxiliary loop 17. The second element 26 of the electric powertrain of the vehicle is an electrical energy storage battery in this case. The battery 26 can supply the energy necessary for the drive of the vehicle. The auxiliary loop 17 is isolated from the rest of the heat-transfer fluid circuit 1.

The first bypass branch B has a second expansion device 22 disposed upstream of the fourth bifluid exchanger 20. The refrigerant fluid expanded by the second expansion device 22 can as a result evaporate in the fourth bifluid exchanger 20 and thus absorb heat from the second element 26 of the electric powertrain of the vehicle in order to cool it.

The first junction point 31 is disposed on the main loop A of the refrigerant fluid circuit 6 upstream of the first expansion device 10.

The main loop A of the refrigerant fluid circuit 6 has a refrigerant fluid accumulation device 21 disposed downstream of the third bifluid exchanger 16 and upstream of the compression device 7.

In the example shown, the main loop A of the refrigerant fluid circuit 6 has a refrigerant fluid accumulation device 21 disposed downstream of the third bifluid exchanger 16 and upstream of the second junction point 32. In other words, the refrigerant fluid circulating in the first bypass branch B returns to the main loop A downstream of the accumulator 21 and therefore does not enter the accumulator 21.

According to a variant which is not shown, the main loop A of the refrigerant fluid circuit 6 has a refrigerant fluid accumulation device 21 disposed downstream of the second junction point 32 and upstream of the compression device 7. In this case, the refrigerant fluid circulating in the first bypass branch B returns to the main loop A upstream of the accumulator 21 and therefore passes through the accumulator 21.

Figure 2:
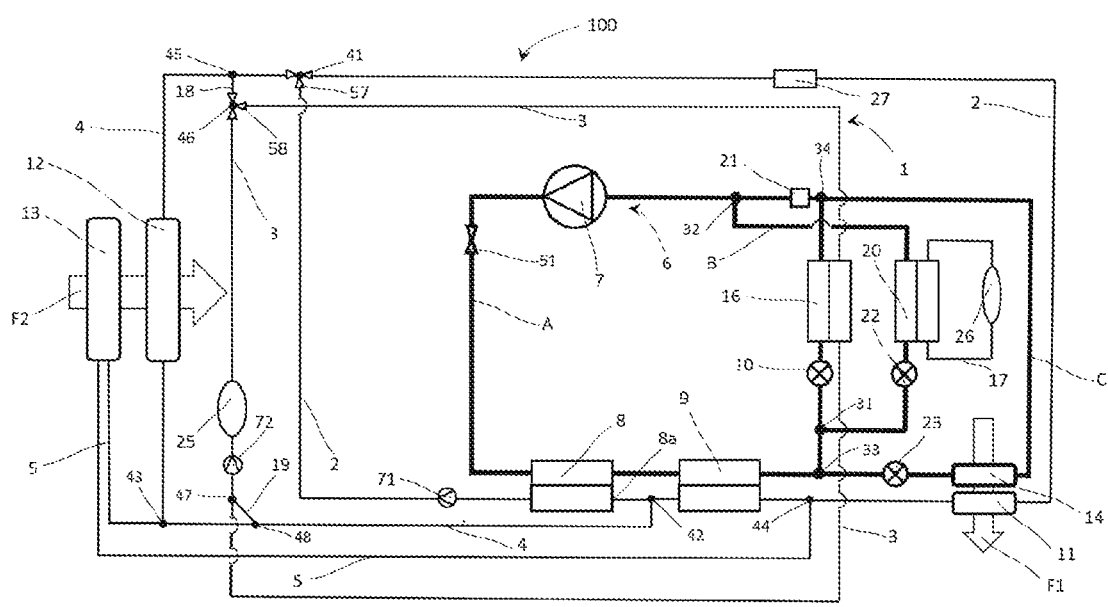
FIG. 2 is a schematic view of a thermal conditioning system according to a second embodiment of the invention.

According to a second embodiment, which is illustrated in FIG. 2, the refrigerant fluid circuit 6 also has a second bypass branch C linking a third junction point 33 disposed on the main loop A downstream of the second bifluid exchanger 9 and upstream of the first junction point 31 to a fourth junction point 34 disposed on the main loop A downstream of the third bifluid exchanger 16 and upstream of the second junction point 32, the second bypass branch C having the following in succession: a third expansion device 23 and a fourth heat exchanger 14 configured to exchange heat with the first air stream F1. In other words, the refrigerant fluid circuit 6 of the second embodiment comprises an additional bypass branch in relation to the first embodiment.

The fourth heat exchanger 14 is disposed upstream of the third heat exchanger 13 in a direction of flow of the first air stream F1. The fourth heat exchanger 14 and the third heat exchanger 13 in this case are disposed in the heating, ventilating and air conditioning installation of the vehicle.

Figure 5:
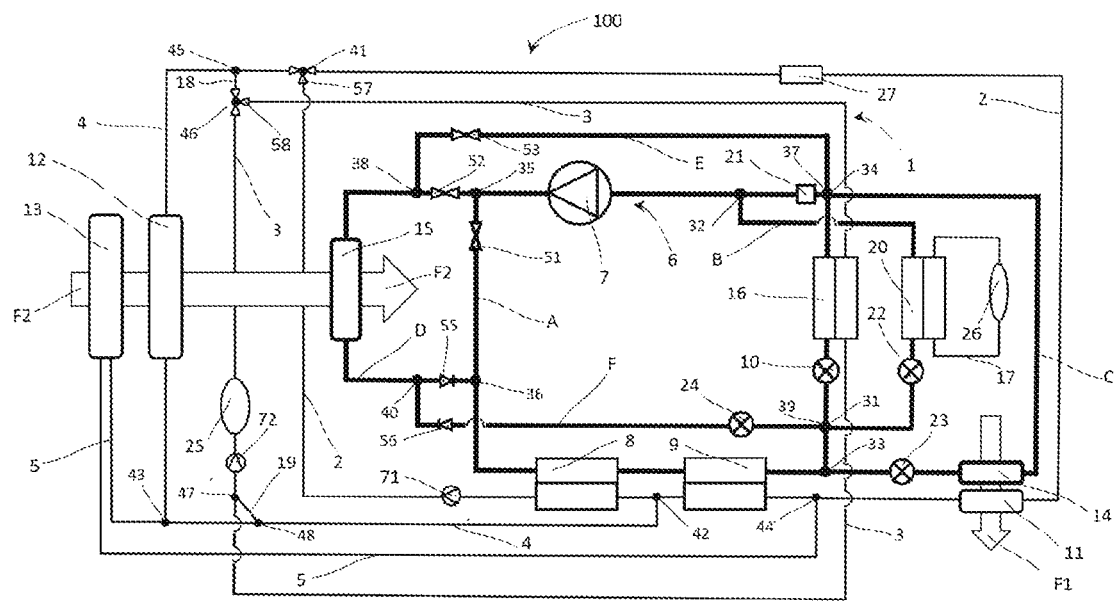
FIG. 5 is a schematic view of a thermal conditioning system according to a third embodiment of the invention.

According to a third embodiment, which is illustrated notably in FIG. 5, the refrigerant fluid circuit 6 also has a third bypass branch D linking a fifth junction point 35 disposed on the main loop A downstream of the compression device 7 and upstream of the second bifluid exchanger 9 to a sixth junction point 36 disposed on the main loop A downstream of the fifth junction point 35, the third bypass branch D having a fifth heat exchanger 15 configured to exchange heat with the second air stream F2. The fifth heat exchanger 15 is disposed downstream of the second heat exchanger 12 in a direction of flow of the second air stream F2.

In the embodiment of FIG. 5, the refrigerant fluid circuit 6 also has a fourth bypass branch E linking a seventh junction point 37 disposed on the main loop A downstream of the fourth junction point 34 and upstream of the compression device 7 to an eighth junction point 38 disposed on the third bypass branch D downstream of the fifth junction point 35 and upstream of the fifth heat exchanger 15.

The refrigerant fluid circuit 6 also has a fifth bypass branch F linking a ninth junction point 39 disposed on the main loop A downstream of the third junction point 33 and upstream of the third bifluid exchanger 16 to a tenth junction point 40 disposed on the third bypass branch D downstream of the fifth heat exchanger 15 and upstream of the sixth junction point 36, and the fifth bypass branch F has a fourth expansion device 24.

In order to simplify the illustrative figures, the fourth junction point 34 is shown coincident with the seventh junction point 37. Similarly, the ninth junction point 39 is shown coincident with the first junction point 31. These junction points can of course be separate, that is to say offset along a circuit portion.

Figure 3:
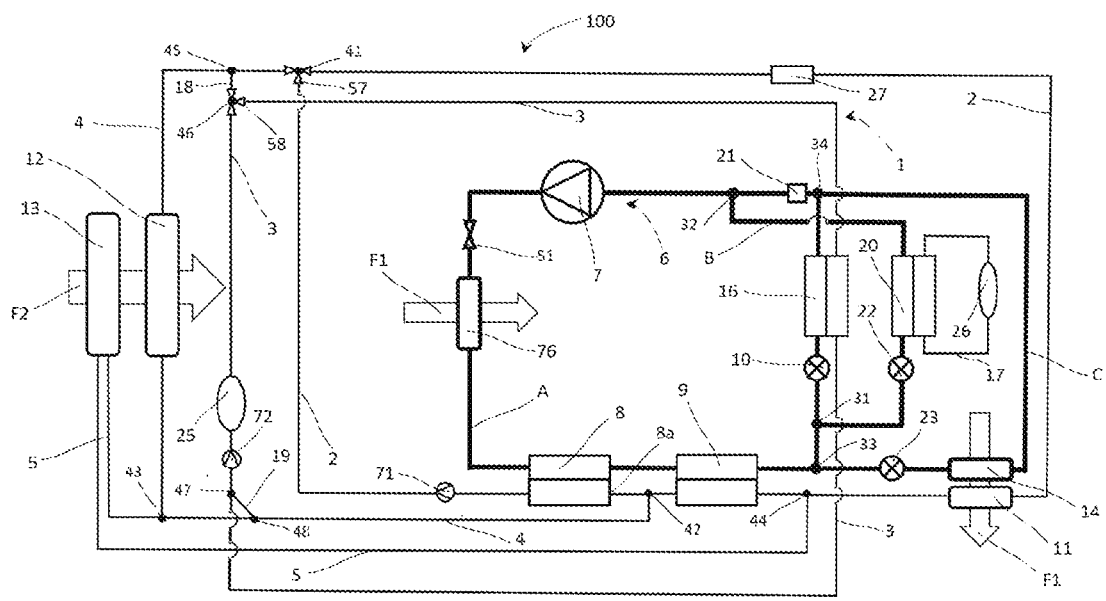
FIG. 3 is a schematic view of a thermal conditioning system according to a first variant of the second embodiment of the invention.

According to one embodiment, which is illustrated in FIG. 3, the main loop A of the refrigerant fluid circuit 6 comprises a sixth heat exchanger 76 disposed upstream of the first expansion device 10, the sixth heat exchanger 76 being configured to exchange heat with the first air stream F1. Since the sixth heat exchanger 76 makes it possible to exchange heat directly with the first air stream F1, the first air stream F1 can be heated more quickly than when the heating is provided by the first heat exchanger 11.

In the embodiment of FIG. 3, the sixth heat exchanger 76 is disposed upstream of the first bifluid exchanger 8 in the direction of travel of the refrigerant fluid. For the sake of clarity in FIG. 3, the air stream F1 is shown in the form of two separate arrows F1. It will be understood that these two arrows concern one and the same air stream in this case. The sixth heat exchanger 76 is disposed downstream of the fourth heat exchanger 14 in the direction of flow of the air stream F1.

Figure 4:
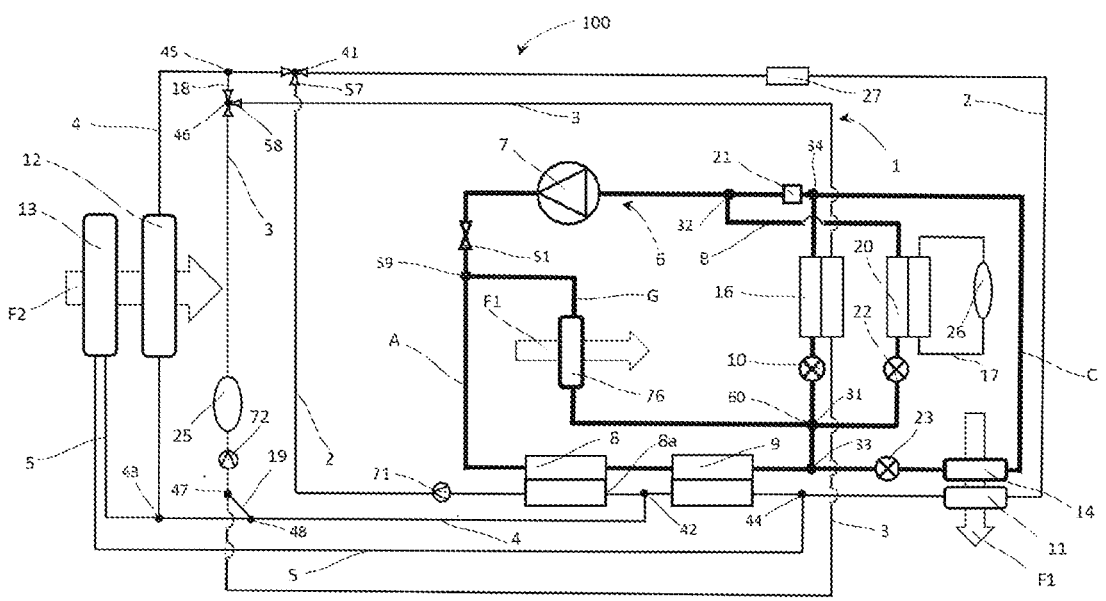
FIG. 4 is a schematic view of a thermal conditioning system according to a second variant of the second embodiment of the invention.

According to the embodiment illustrated in FIG. 4, the refrigerant fluid circuit 6 has a sixth bypass branch G linking an eleventh junction point 59 disposed on the main loop A upstream of the first bifluid exchanger 8 to a twelfth junction point 60 disposed on the main loop A downstream of the second bifluid exchanger 9, and wherein the sixth bypass branch G comprises a sixth heat exchanger 76 configured to exchange heat with the first air stream F1. The twelfth junction point 60 is upstream of the first expansion device 10. In other words, the sixth bypass branch G is a branch for circumventing the first bifluid exchanger 8 and the second bifluid exchanger 9.

In this variant, the sixth heat exchanger 76 is added to the structure of the second embodiment. The sixth heat exchanger 76 can also be added to the structure of the refrigerant fluid circuit 6 of the first embodiment and to that of the third embodiment. These two variants have not been shown.

The refrigerant fluid circuit 6 comprises multiple shut-off valves for preventing or allowing the circulation of refrigerant fluid in various portions of the circuit 6.

Thus, the main loop A of the refrigerant fluid circuit 6 has a first shut-off valve 51 disposed between the fifth junction point 35 and the sixth junction point 36. The third bypass branch D has a second shut-off valve 52 disposed between the fifth junction point 35 and the eighth junction point 38. The fourth bypass branch E has a third shut-off valve 53.

Each of the shut-off valves 51, 52, 53 is configured to selectively prevent or allow the circulation of refrigerant fluid in the circulation branch on which the shut-off valve is disposed. Thus, the second shut-off valve 52 is configured to selectively allow or prevent the entry of refrigerant fluid into the third bypass branch D. The third shut-off valve 53 is configured to selectively allow or prevent the entry of refrigerant fluid into the fourth bypass branch E.

The third bypass branch D has a first non-return valve 55 configured to prevent circulation of the refrigerant fluid from the sixth junction point 36 to the tenth junction point 40. The fifth bypass branch F has a second non-return valve 56 configured to prevent circulation of the refrigerant fluid from the tenth junction point 40 to the ninth junction point 39.

The heat-transfer fluid circuit 1 has multiple pumps for circulating the heat-transfer liquid in various portions of the circuit 1.

Thus, the main loop 2 for heat-transfer liquid has a first heat-transfer liquid circulation pump 71. The first heat-transfer liquid circulation pump 71 is disposed between the first connection point 41 and the second connection point 42. The first circulation pump 71 is configured to circulate the heat-transfer liquid from the first bifluid exchanger 8 to the first connection point 41. The sign 71a denotes the inlet of the first pump 71, and the sign 71b denotes the outlet of the first pump 71.

The secondary loop 3 for heat-transfer liquid has a second heat-transfer liquid circulation pump 72. The second heat-transfer liquid circulation pump 72 is disposed on the secondary loop 3 between the seventh connection point 47 and the sixth connection point 46. The second heat-transfer liquid circulation pump 72 is configured to circulate the heat-transfer liquid from the seventh connection point 47 to the sixth connection point 46. The sign 72a denotes the inlet of the second pump 72, and the sign 72b denotes the outlet of the second pump 72.

In the embodiments described, the link between the various branches or loops of the heat-transfer liquid circuit 1 involves three-way valves. Three-way valves are understood to mean valves in which a movable shut-off means makes it possible to place an inlet/outlet port in communication with one or the other of the two other inlet/outlet ports, or to place the three inlet/outlet ports in communication.

The main loop 2 for circulation of heat-transfer liquid has a first three-way valve 57 disposed both on the main loop 2 and on the first branch 4. In the example illustrated, the first connection point 41 forms part of the first three-way valve 57 in this case. A first port 57a and a second port 57b of the first three-way valve 57 are disposed on the main loop 2. A third port 57c of the first three-way valve 57 is disposed on the first branch 4. The first three-way valve 57 makes it possible to place the main loop 2 for circulation of heat-transfer liquid 2 and the first branch 4 in communication.

The secondary loop 3 for circulation of heat-transfer liquid has a second three-way valve 58 disposed both on the secondary loop 3 and on the third branch 18. The sixth connection point 46 forms part of the second three-way valve 58 in this case. A first port 58a and a second port 58b of the second three-way valve 58 are disposed on the secondary loop 3. A third port 58c of the second three-way valve 58 is disposed on the third branch 18. The second three-way valve 58 makes it possible to place the secondary loop 3 and the first branch 4 in communication via the third branch 18, which ensures a fluidic connection between the two.

According to a variant which is not shown, the third port 58c of the second three-way valve 58 is directly linked to the third branch 4. Then, the third branch 18 is not present. In other words, the fifth connection point 45 and the sixth connection point 46 are then coincident and form part of the second three-way valve 58.

In the same way, according to a variant which is not shown, the fourth branch 19 is not present. In this case, the seventh connection point 47 and the eighth connection point 48 are coincident. The secondary loop 3 and the first branch 4 are directly linked.

Figure 7:
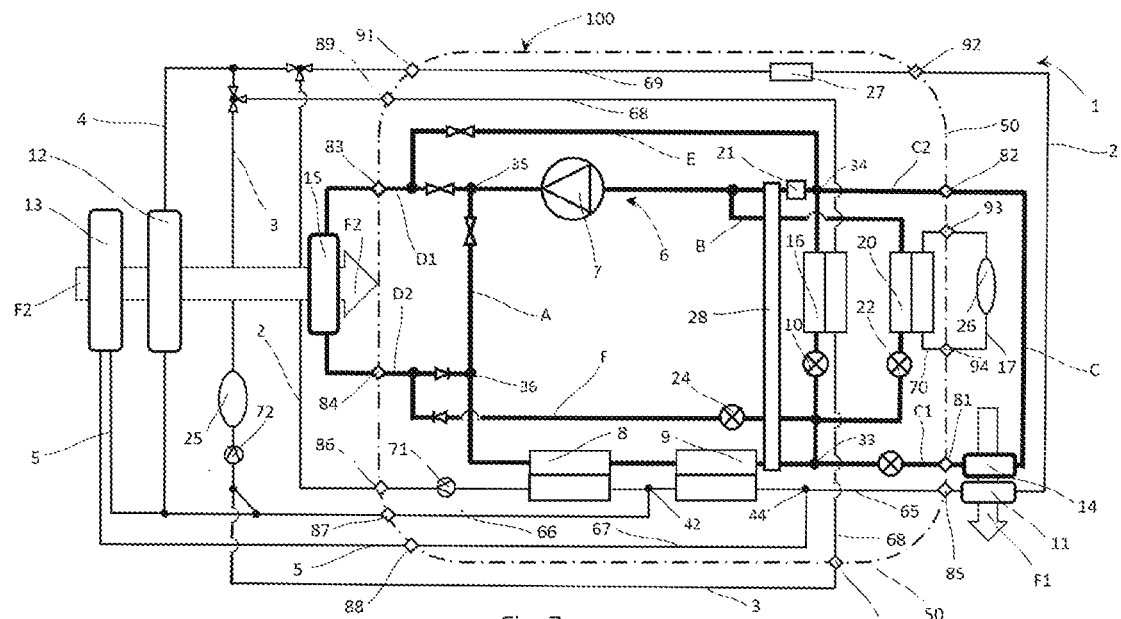
FIG. 7 is a schematic view of a thermal conditioning system according to a fourth embodiment of the invention.

According to embodiments which are illustrated notably in FIG. 1 and FIG. 7, the thermal conditioning system 100 has a casing 50 which defines a receiving volume, and the main loop A of the refrigerant fluid circuit 6 is inside the casing 50.

The casing 50 defines a closed volume which incorporates the refrigerant fluid circuit 6. The casing 50 defines a volume which is leaktight with respect to the refrigerant fluid.

The first bypass branch B of the refrigerant fluid circuit 6 is inside the casing 50. In other words, in the embodiments and embodiment variants in which the refrigerant fluid circuit 6 has only the main loop A and the first bypass branch B, all of the refrigerant fluid circuit 6 is inside the casing 50. This is the scenario in the example of FIG. 1.

It is thus possible to group all the components of the refrigerant fluid circuit 6 inside one and the same module. The refrigerant fluid circuit 6 can thus be fully assembled and tested before being delivered. The refrigerant fluid circuit 6 can thus be already filled and ready for operation at the time of delivery. The operations for mounting it on a vehicle are therefore quicker and easier, since some of the mounting is done before delivery.

According to other embodiments in which the refrigerant fluid circuit comprises one or more heat exchangers that perform exchange with the first air stream F1 or the second air stream F2, the casing 50 comprises inlets/outlets toward the outside. In other words, in this scenario, only part of the refrigerant fluid circuit 6 is in the casing 50. This is the scenario in the example of FIG. 7. The casing 50 makes it possible to group the main components together in one and the same module. The heat exchangers external to the module are easily connected to the module depending on the desired configuration. A standard module can be used, and the various options can be connected easily and quickly. The mounting is facilitated and is quicker than when the various elements are assembled individually. One and the same standard module can be used for a wide variety of different applications.

The second bypass branch C of the refrigerant fluid circuit 6 has a first portion C1 inside the casing 50, the casing 50 has a first inlet/outlet 81 for refrigerant fluid, the first portion C1 linking the third junction point 33 and the ninth inlet/outlet 81. The second bypass branch C of the refrigerant fluid circuit 6 has a second portion C2 inside the casing 50, and the casing 50 has a second inlet/outlet 82 for refrigerant fluid, the second portion C2 linking the fourth junction point 34 and the second inlet/outlet 82.

The third expansion device 23 is inside the casing 50.

The third bypass branch D of the refrigerant fluid circuit 6 has a third portion D1 inside the casing 50, and the casing 50 has a third inlet/outlet 83 for refrigerant fluid, the third portion D1 linking the fifth junction point 35 and the third inlet/outlet 83. The third bypass branch D of the refrigerant fluid circuit 6 has a fourth portion D2 inside the casing 50, and the casing 50 has a fourth inlet/outlet 84 for refrigerant fluid, the fourth portion D2 linking the sixth junction point 36 and the fourth inlet/outlet 84.

The fourth bypass branch E is inside the casing 50. The fifth bypass branch F is inside the casing 50. The first shut-off valve 51, the second shut-off valve 52 and the third shut-off valve 53 are inside the casing 50. The first non-return valve 55 and the second non-return valve 56 are inside the casing 50. The compression device 7 is inside the casing 50.

The heat-transfer liquid circuit 1 can also be partially incorporated in the aforementioned module.

Thus, the main loop 2 of the heat-transfer liquid circuit 1 has a fifth portion 65 inside the casing 50, the casing 50 has a fifth inlet/outlet 85 for heat-transfer liquid and a sixth inlet/outlet 86 for heat-transfer liquid, the fifth portion 65 linking the fifth inlet/outlet 85 and the sixth inlet/outlet 86, and the first bifluid exchanger 8 and the second bifluid exchanger 9 are disposed on the fifth portion 65. It will be understood that the element denoted by the term inlet/outlet can, depending on the operating conditions, be either an inlet for heat-transfer liquid into the casing 50 or an outlet for heat-transfer liquid out of the casing 50.

The first branch 4 of the heat-transfer liquid circuit 1 has a sixth portion 66 inside the casing 50, the casing 50 has a seventh inlet/outlet 87 for heat-transfer liquid, the sixth portion 66 linking the seventh inlet/outlet 87 and the second connection point 42.

The second branch 5 of the heat-transfer liquid circuit 1 has a seventh portion 67 inside the casing 50, the receiving casing 1 has an eighth inlet/outlet 88 for heat-transfer liquid, and the seventh portion 67 links the eighth inlet/outlet 88 and the fourth connection point 44.

The secondary loop 3 of the heat-transfer liquid circuit 1 has an eighth portion 68 inside the casing 50, the casing 50 has a ninth inlet/outlet 89 for heat-transfer liquid and a tenth inlet/outlet 90 for heat-transfer liquid, the eighth portion 68 linking the ninth inlet/outlet 89 and the tenth inlet/outlet 90, and the third bifluid exchanger 16 is disposed on the eighth portion 68.

The main loop 2 of the heat-transfer liquid circuit 1 has a ninth portion 69 inside the casing 50, the casing 50 has an eleventh inlet/outlet 91 for heat-transfer liquid and a twelfth inlet/outlet 92 for heat-transfer liquid, the ninth portion 69 linking the eleventh inlet/outlet 91 and the twelfth inlet/outlet 92.

The first heat-transfer liquid circulation pump 71 is inside the casing 50. The second connection point 42 is disposed inside the casing 50.

The main loop 2 of the heat-transfer liquid circuit 1 has an electric heating device 27 configured to heat the heat-transfer liquid. The electric heating device 27 supplements the heating of the heat-transfer liquid provided by the first bifluid exchanger 8 and the second bifluid exchanger 9. The activation of the electric heater 27 makes it possible notably to reduce the response time of the thermal conditioning system.

According to an exemplary embodiment which is not shown, the electric heating device 27 is disposed outside the casing 50.

Figure 6:
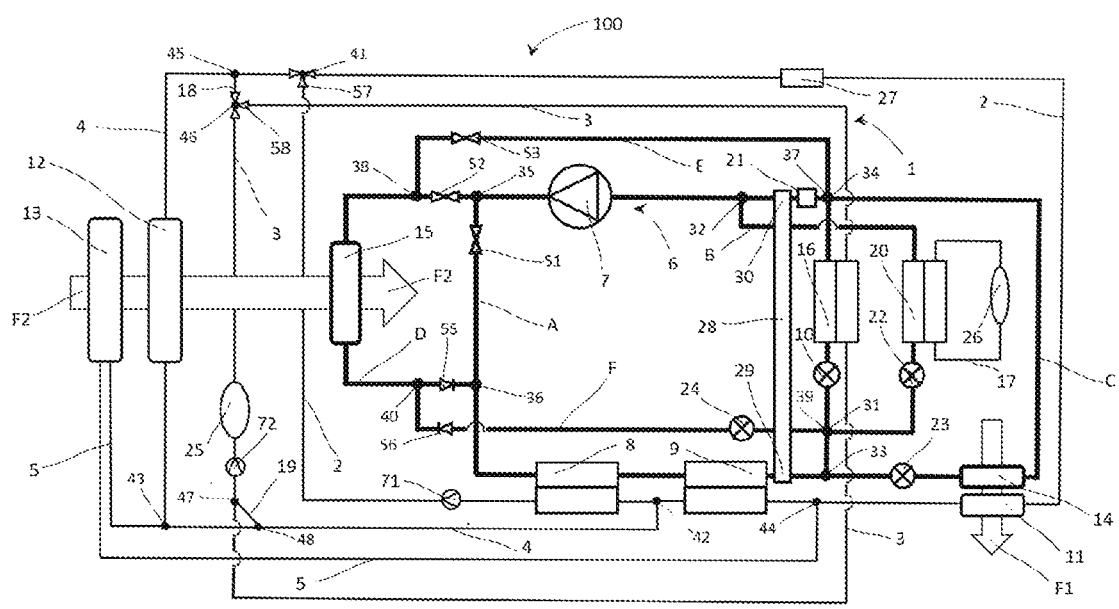
FIG. 6 is a schematic view of a thermal conditioning system according to a variant of the third embodiment.

In the examples schematically shown in FIG. 1 and FIG. 6, the electric heating device 27 is inside the casing 50. The electric heating device 27 is disposed on the ninth portion 69.

The auxiliary loop 17 of the heat-transfer liquid circuit 1 has a tenth portion 70 inside the casing 50, the casing 50 has a thirteenth inlet/outlet 93 for heat-transfer liquid and a fourteenth inlet/outlet 94 for heat-transfer liquid, the tenth portion 70a linking the thirteenth inlet/outlet 91 and the fourteenth inlet/outlet 94, and the fourth bifluid exchanger 20 is disposed on the tenth portion 70.

Each inlet/outlet disposed on the heat-transfer liquid circuit 1 makes it possible to join a circuit portion that is inside the casing 50 to a circuit portion that is disposed outside the casing 50. Various types of join can be used. The joins have not been shown in detail in the figures. Similarly, each inlet/outlet disposed on the refrigerant fluid circuit 6 makes it possible to join a circuit portion that is inside the casing 50 to a circuit portion that is disposed outside the casing 50.

According to the variant of the third embodiment that is illustrated in FIG. 6, the main loop A comprises an internal heat exchanger 28, the internal heat exchanger 28 having a first heat exchange section 29 disposed downstream of the tenth bifluid exchanger 9 and upstream of the first junction point 31 and a second heat exchange section 30 disposed downstream of the refrigerant fluid accumulation device 21 and upstream of the compression device 7, the internal heat exchanger 28 being configured to enable an exchange of heat between the refrigerant fluid in the first heat exchange section 29 and the refrigerant fluid in the second heat exchange section 30.

According to the fourth embodiment, the internal heat exchanger 28 is disposed inside the casing 50.

The casing 50 has been shown in the context of the first embodiment, in FIG. 1, and in the context of the fourth embodiment, in FIG. 6. The casing 50 can by all means also be used for the other embodiments and variants that are described in FIGS. 2, 3 and 4.

The thermal conditioning system 100 described beforehand can operate in accordance with numerous modes of operation, that is to say implement numerous different operating methods. Some of these will be described below, and illustrated in FIGS. 7 to 9. In these figures, the circuit portions in which refrigerant fluid or heat-transfer liquid circulate are shown in thick line. The portions in which the refrigerant fluid does not circulate are shown in dotted line. Similarly, the portions in which the heat-transfer liquid does not circulate are also shown in dotted line.

Figure 8:
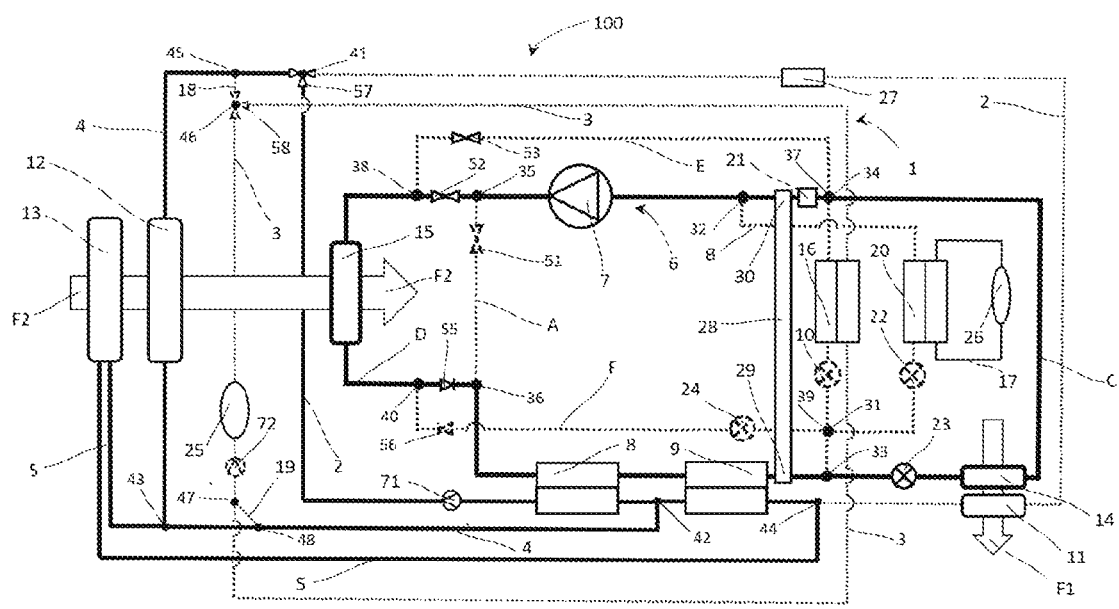
FIG. 8 shows a schematic view of the thermal conditioning system of FIG. 6 according to a first mode of operation referred to as cooling mode.

According to a method for operating a thermal conditioning system as described above in a mode referred to as cooling mode, which is schematically shown in FIG. 8:

the refrigerant fluid circulates in the compression device 7, where it is brought to high pressure, and circulates in succession in the fifth heat exchanger 15, where it gives up heat to the second air stream F2, in the first bifluid exchanger 8, in the second bifluid exchanger 9, in the third expansion device 23, where it is brought to low pressure, and in the fourth heat exchanger 14, where it absorbs heat from the first air stream F1, the low-pressure refrigerant fluid returning to the compression device 7, the heat-transfer liquid circulates in succession in the second bifluid exchanger 9, in the first bifluid exchanger 8, and in the second heat exchanger 12, where it gives up heat to the second air stream F2, and splits into a first flow circulating in the first branch 4 and a second flow circulating in the second branch 5, the first flow meeting the main loop 2 upstream of the first bifluid exchanger 8 and the second flow meeting the main loop 2 upstream of the second bifluid exchanger 9.

In this mode of operation, the fifth heat exchanger 15 operates as a condenser and dissipates the heat from the high-pressure and high-temperature refrigerant fluid at the outlet of the compressor 7 into the second air stream F2. Depending on the operating conditions, the first bifluid exchanger 8 finishes the condensation or supercools the refrigerant fluid. The second bifluid exchanger 9, which is coupled to the third heat exchanger 13 receiving the coldest first air stream F1, supercools the refrigerant fluid. The expansion, in the third expansion device 23, of the super-cooled refrigerant fluid thus ensures particularly effective cooling of the first air stream F1 which passes through the fourth heat exchanger 14. If present, the internal heat exchanger 28 further increases the amount of heat exchanged and therefore the degree of cooling of the first air stream F1. Once the heat transfer liquid has passed through the first bifluid exchanger 8, it passes through the second heat exchanger 12 and dissipates heat into the second air stream F2. Some of the flow of heat-transfer liquid exiting the second heat exchanger 12 remains in the first branch 4 and joins the main loop 2 between the two bifluid exchangers 8, 9 at the second connection point 42. The rest of the flow of heat-transfer liquid passes along the second branch 5, passes through the third heat exchanger 13 and returns to the main loop 2 upstream of the second bifluid exchanger 9. The second bifluid exchanger 9 therefore receives heat-transfer liquid at a lower temperature than that of the heat-transfer liquid received by the first bifluid exchanger 8. According to the embodiment shown, the distribution at the third connection point 43 among the flow remaining in the first branch 4 and the flow entering the second branch 5 is done depending on the relative pressure drops in the first branch between the third connection point 43 and the second connection point 42, and in the circuit portion comprising the second branch 5 between the points 43 and 44 and the portion of the main loop 2 that is between the point 44 and the point 42. In practice, the flow in the first branch 4 is greater than the flow in the second branch 5. The second bifluid exchanger 9 thus receives low-temperature heat-transfer liquid, this making it possible to ensure very effective supercooling of the refrigerant fluid. The capacity for cooling the first air stream F1 is maximized as a result.

On the refrigerant fluid circuit 6, the first shut-off valve 51 and the third shut-off valve 53 are closed, and the second shut-off valve 52 is open. The first expansion device 10, and second expansion device 22 and the fourth expansion device 24 are in the closed position and prevent the passage of refrigerant fluid. On the heat-transfer liquid circuit 1, the three-way valve 57 directs the heat-transfer liquid exiting the pump 71 toward the first branch 4 and prevents the circulation of heat-transfer liquid toward the first heat exchanger 11.

Figure 9:
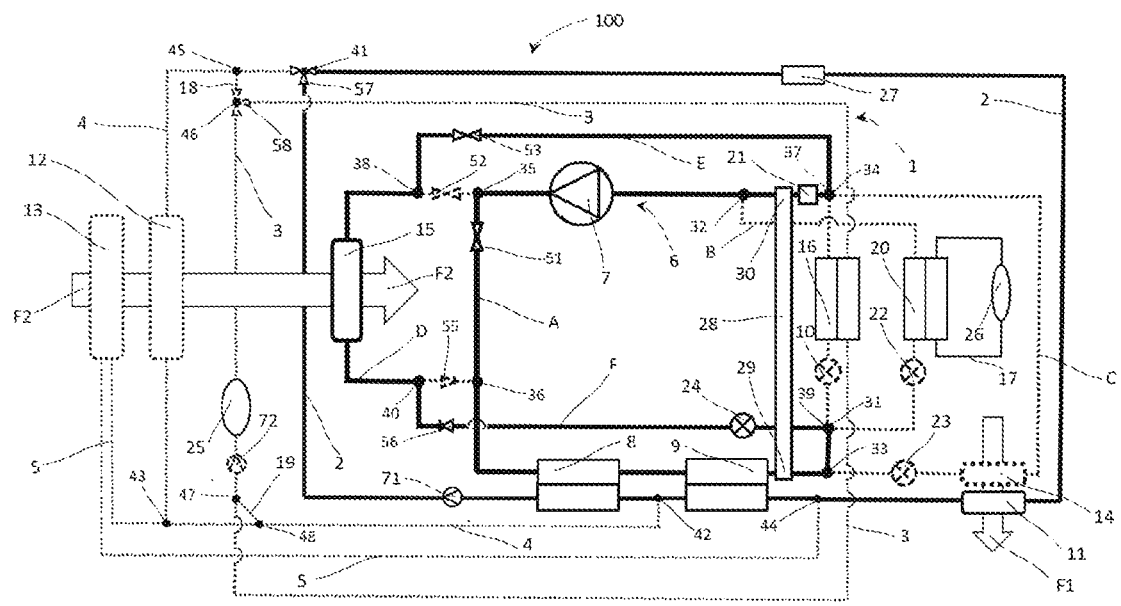
FIG. 9 shows a schematic view of the thermal conditioning system of FIG. 6 according to a second mode of operation referred to as heating mode.

According to a method for operating a thermal conditioning system as described above in a mode referred to as heating mode, which is schematically shown in FIG. 9:

the refrigerant fluid circulates in the compression device 7, where it is brought to high pressure, and circulates in succession in the first bifluid exchanger 8, where it gives up heat to the heat-transfer liquid, in the second bifluid exchanger 9, where it gives up heat to the heat-transfer liquid, in the fourth expansion device 24, where it is brought to low pressure, and in the fifth heat exchanger 15, where it absorbs heat from the second air stream F2, the low-pressure refrigerant fluid returning to the compression device 7, the heat-transfer liquid circulates in succession in the second bifluid exchanger 9, where it receives heat from the refrigerant fluid, in the first bifluid exchanger 8, where it receives heat from the refrigerant fluid, and in the first heat exchanger 11, where it gives up heat to the first air stream F1.

In this mode of operation, the first bifluid exchanger 8 operates as a condenser, and dissipates the heat from the high-pressure and high-temperature refrigerant fluid into the heat-transfer liquid in the main loop 2. The second bifluid exchanger 9 finishes the condensation and also dissipates heat into the heat-transfer liquid. The heat-transfer liquid circulates in the first heat exchanger 11, which thus heats the first air stream F1. The additional heating device 27 can be activated in order to increase the temperature of the heat-transfer liquid. The three-way valve 57 prevents the circulation of refrigerant fluid in the first branch 4, and thus also in the second branch 5. The expansion of the refrigerant fluid in the fourth expansion device 24 brings the refrigerant liquid to low pressure and the latter evaporates as it passes through the fifth heat exchanger 15 by drawing heat from the second air stream F2. The low-pressure refrigerant fluid then passes along the fourth bypass branch E and joins the main loop A upstream of the accumulation device 21. To enable this refrigerant fluid circulation mode, the second shut-off valve 52 is closed. The first shut-off valve 51 and the third shut-off valve 53 are open.

Figure 10:
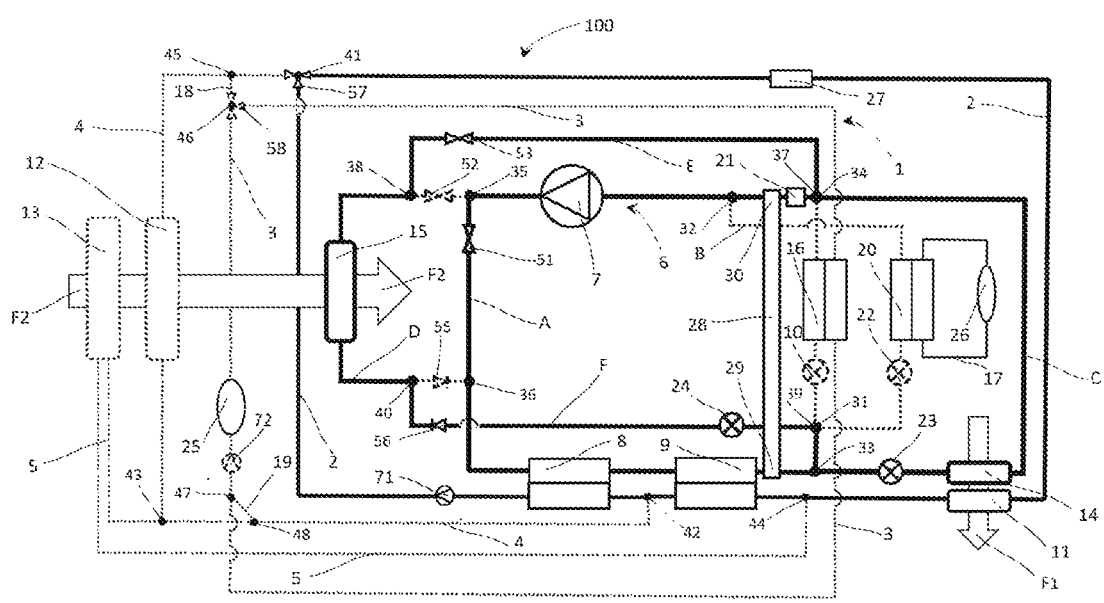
FIG. 10 shows a schematic view of the thermal conditioning system of FIG. 6 according to a third mode of operation referred to as parallel dehumidification mode.

According to a method for operating a thermal conditioning system as described above in a mode referred to as parallel dehumidification mode, which is schematically shown in FIG. 10:

the refrigerant fluid circulates in the compression device 7, where it is brought to high pressure, and circulates in succession in the first bifluid exchanger 8, where it gives up heat to the heat-transfer liquid, and in the second bifluid exchanger 9, where it gives up heat to the heat-transfer liquid, and splits into a first flow and a second flow, the first flow circulating in the fourth expansion device 24, where it is brought to low pressure, and in the fifth heat exchanger 15, where it absorbs heat from the second air stream F2, the second flow circulating in the third expansion device 23, where it is brought to low pressure, and in the fourth heat exchanger 14, where it absorbs heat from the first air stream F1, the first flow of low-pressure refrigerant fluid and the second flow of low-pressure refrigerant fluid meeting one another before reaching the compression device 7, the heat-transfer liquid circulates in succession in the second bifluid exchanger 9, where it receives heat from the refrigerant fluid, in the first bifluid exchanger 8, where it receives heat from the refrigerant fluid, and in the first heat exchanger 11, where it gives up heat to the first air stream F1.

This mode of operation differs from the preceding one in that some of the flow of refrigerant fluid exiting the second bifluid exchanger 9 circulates in the second bypass branch C and passes through the fourth heat exchanger 14 after having been expanded in the third expansion device 23. The first air stream F1 is therefore cooled as it passes through the fourth heat exchanger 14 and is reheated as it then passes through the first heat exchanger 11. The first air stream F1 is thus dehumidified. The distribution among the flow of refrigerant fluid passing through the fifth heat exchanger 15 and the flow of refrigerant fluid passing through the fourth heat exchanger 14 is done in a position of the effective section of the fourth expansion device 24 and the third expansion device 23.

Numerous other modes of operation are possible. In particular, a degree of opening of the first expansion device 10, associated with the circulation of heat-transfer liquid in the secondary loop 3, makes it possible to ensure cooling of the first element 25. Similarly, a degree of opening of the second expansion device 22 makes it possible to ensure cooling of the second element 26. These circulations of refrigerant fluid can be added to the modes of operation already described, on their own or in combination.

What is claimed is:

1. A thermal conditioning system comprising:
a heat-transfer liquid circuit including:
a main circulation loop, a secondary loop, a first branch and a second branch,
a refrigerant fluid circuit including a main loop for circulation of refrigerant fluid having the following in succession in a direction of circulation of the refrigerant fluid:

a compression device, a first bifluid exchanger arranged both on the refrigerant fluid circuit and on the main loop of the heat-transfer liquid circuit so as to enable an exchange of heat between the refrigerant fluid and the heat-transfer liquid in the main loop, a second bifluid exchanger arranged both on the refrigerant fluid circuit and on the main loop of the heat-transfer liquid circuit so as to enable an exchange of heat between the refrigerant fluid and the heat-transfer liquid in the main loop, a first expansion device, a third bifluid exchanger arranged both on the refrigerant fluid circuit and on the secondary loop of the heat-transfer liquid circuit so as to enable an exchange of heat between the refrigerant fluid and the heat-transfer liquid in the secondary loop, wherein the first branch of the heat-transfer liquid circuit links a first connection point disposed on the main loop to a second connection point disposed on the main loop, the first branch being configured such that the heat-transfer liquid at the outlet of the first bifluid exchanger returns to an inlet of the first bifluid exchanger without passing through the second bifluid exchanger, the first branch having a second heat exchanger configured to exchange heat with a second air stream, and wherein the second branch of the heat-transfer liquid circuit links a third connection point disposed on the first branch downstream of the second heat exchanger to a fourth connection point disposed on the main loop upstream of the second bifluid exchanger, the second branch having a third heat exchanger configured to exchange heat with the second air stream.

2. The thermal conditioning system as claimed in claim 1, wherein the main loop of the heat-transfer liquid circuit has a first heat exchanger configured to exchange heat with a first air stream.

3. The thermal conditioning system as claimed in claim 2, wherein the first air stream is an air stream internal to an interior of a motor vehicle, and wherein the second air stream is an air stream external to an interior of the vehicle.

4. The thermal conditioning system as claimed in claim 1, wherein the third heat exchanger is disposed upstream of the second heat exchanger in a direction of flow of the second air stream.

5. The thermal conditioning system as claimed in claim 1, wherein the third bifluid exchanger is configured to be thermally coupled to a first element of an electric powertrain of a motor vehicle.

6. The thermal conditioning system as claimed in claim 1, wherein the refrigerant fluid circuit has a first bypass branch linking a first junction point disposed on the main loop downstream of the second bifluid exchanger and upstream of the third bifluid exchanger to a second junction point disposed on the main loop downstream of the third bifluid exchanger and upstream of the compression device, the first bypass branch having a fourth bifluid exchanger configured to be thermally coupled to a second element of an electric powertrain of the vehicle.

7. The thermal conditioning system as claimed in claim 6, wherein the main loop of the refrigerant fluid circuit has a refrigerant fluid accumulation device disposed downstream of the third bifluid exchanger and upstream of the second junction point.

8. The thermal conditioning system as claimed in claim 6, wherein the refrigerant fluid circuit has a second bypass branch linking a third junction point disposed on the main loop downstream of the second bifluid exchanger and upstream of the first junction point to a fourth junction point disposed on the main loop downstream of the third bifluid exchanger and upstream of the second junction point, the second bypass branch having the following in succession: a third expansion device and a fourth heat exchanger configured to exchange heat with the first air stream.

9. The thermal conditioning system as claimed in claim 8, wherein the refrigerant fluid circuit has a fourth bypass branch linking a seventh junction point disposed on the main loop downstream of the fourth junction point and upstream of the compression device to an eighth junction point disposed on the third bypass branch downstream of the fifth junction point and upstream of the fifth heat exchanger, wherein the refrigerant fluid circuit has a fifth bypass branch linking a ninth junction point disposed on the main loop downstream of the third junction point and upstream of the third bifluid exchanger to a tenth junction point disposed on the third bypass branch downstream of the fifth heat exchanger and upstream of the sixth junction point, and wherein the fifth bypass branch has a fourth expansion device.

10. The thermal conditioning system as claimed in claim 6, having a casing which defines a receiving volume, wherein the main loop of the refrigerant fluid circuit is inside the casing, and wherein the first bypass branch of the refrigerant fluid circuit is inside the casing.

11. The thermal conditioning system as claimed in claim 10, wherein the second bypass branch of the refrigerant fluid circuit has a first portion inside the casing, wherein the casing has a first inlet/outlet for refrigerant fluid, the first portion linking the third junction point and the ninth inlet/outlet, and wherein the second bypass branch of the refrigerant fluid circuit has a second portion inside the casing, wherein the casing has a second inlet/outlet for refrigerant fluid, the second portion linking the fourth junction point and the second inlet/outlet.

12. The thermal conditioning system as claimed in claim 1, wherein the refrigerant fluid circuit has a third bypass branch linking a fifth junction point disposed on the main loop downstream of the compression device and upstream of the second bifluid exchanger to a sixth junction point disposed on the main loop downstream of the fifth junction point, the third bypass branch having a fifth heat exchanger configured to exchange heat with the second air stream.

13. The thermal conditioning system as claimed in claim 1, wherein the main loop of the refrigerant fluid circuit includes a sixth heat exchanger disposed upstream of the first expansion device, the sixth heat exchanger being configured to exchange heat with the first air stream.

14. The thermal conditioning system as claimed in claim 1, wherein the refrigerant fluid circuit has a sixth bypass branch linking an eleventh junction point disposed on the main loop upstream of the first bifluid exchanger to a twelfth junction point disposed on the main loop downstream of the second bifluid exchanger, and wherein the sixth bypass branch includes a sixth heat exchanger configured to exchange heat with the first air stream.

15. The thermal conditioning system as claimed in claim 10, wherein the main loop of the heat-transfer liquid circuit has a fifth portion inside the casing, wherein the casing has a fifth inlet/outlet for heat-transfer liquid and a sixth inlet/outlet for heat-transfer liquid, the fifth portion linking the fifth inlet/outlet and the sixth inlet/outlet, wherein the first bifluid exchanger and the second bifluid exchanger are disposed on the fifth portion, wherein the first branch of the heat-transfer liquid circuit has a sixth portion inside the casing, and wherein the casing has a seventh inlet/outlet for heat-transfer liquid, the sixth portion linking the seventh inlet/outlet and the second connection point.

\* \* \* \* \*